Oct. 1, 1940.　　　G. RAYMOND ET AL　　　2,216,296
SHUT-OFF VALVE FOR TANK DISCHARGE LINES
Filed July 5, 1938　　　4 Sheets-Sheet 1
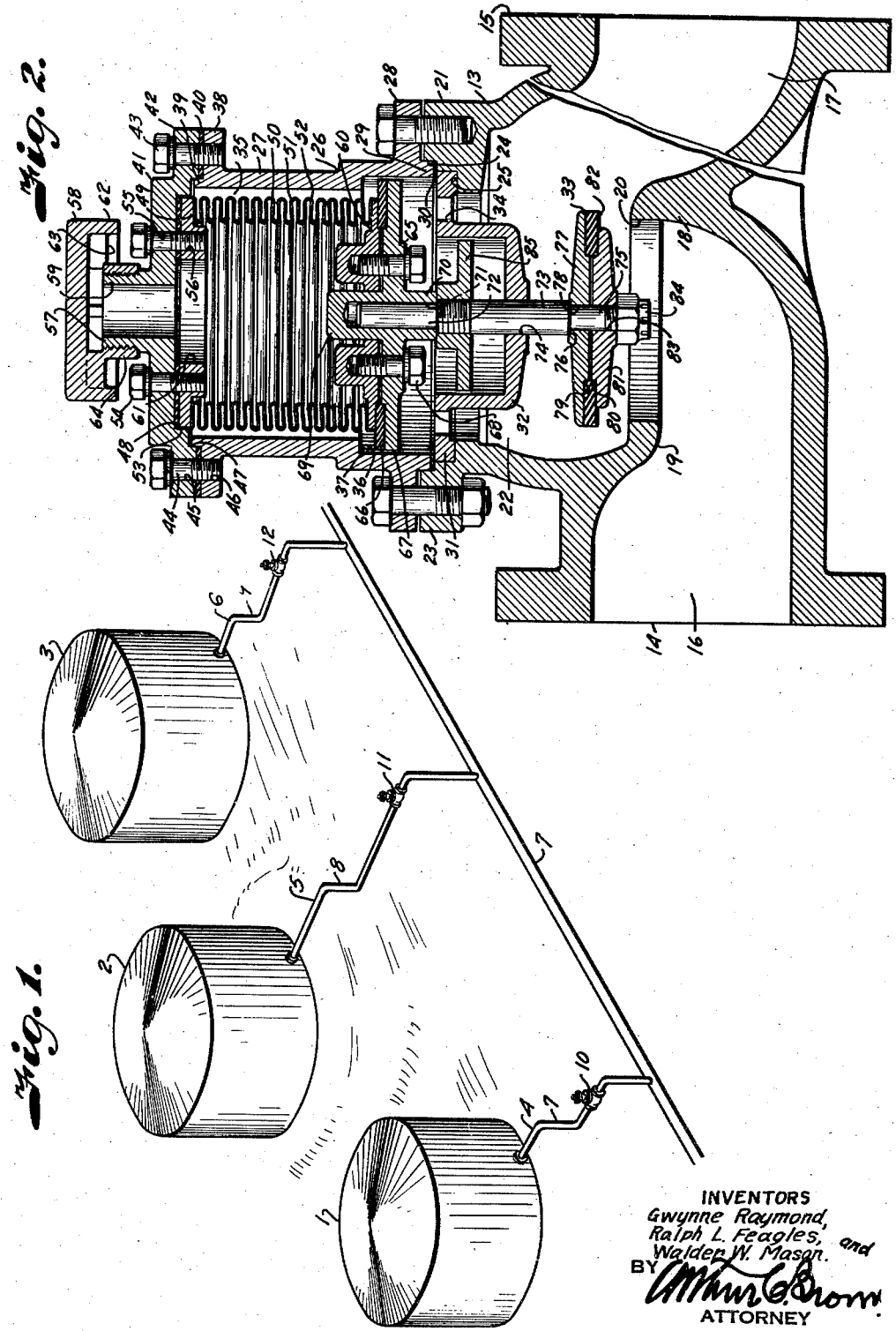
INVENTORS
Gwynne Raymond,
Ralph L. Feagles, and
Walden W. Mason.
BY
ATTORNEY

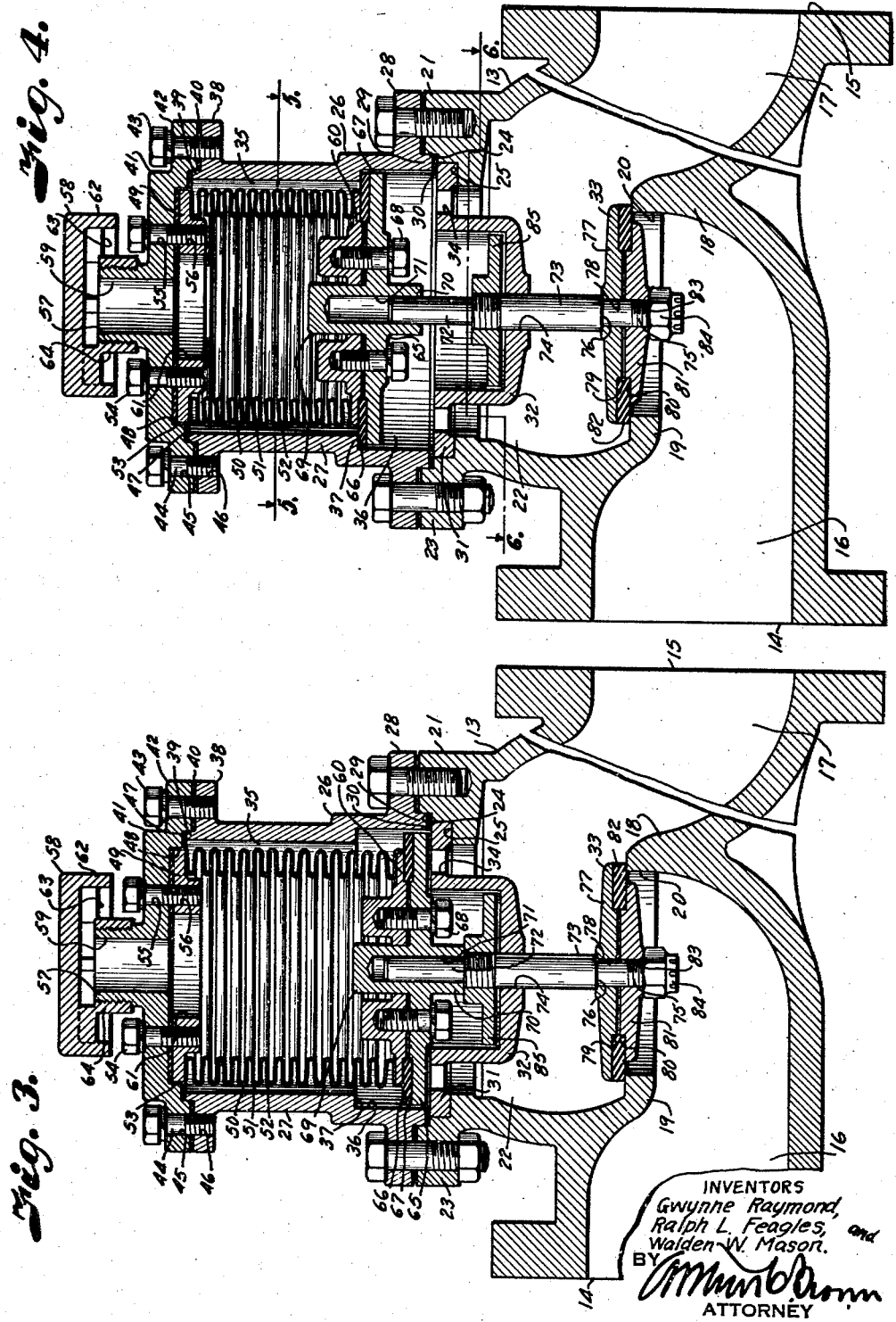

Oct. 1, 1940.    G. RAYMOND ET AL    2,216,296
SHUT-OFF VALVE FOR TANK DISCHARGE LINES
Filed July 5, 1938    4 Sheets-Sheet 3

INVENTORS
Gwynne Raymond,
Ralph L. Feagles, and
Walden W. Mason.
BY
ATTORNEY

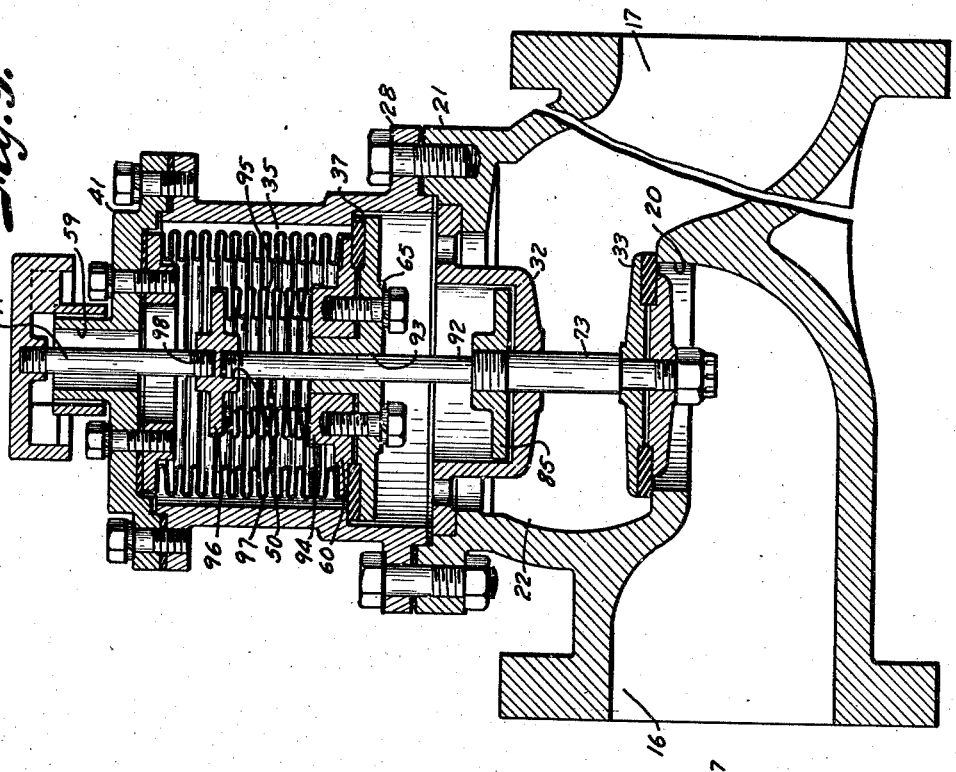
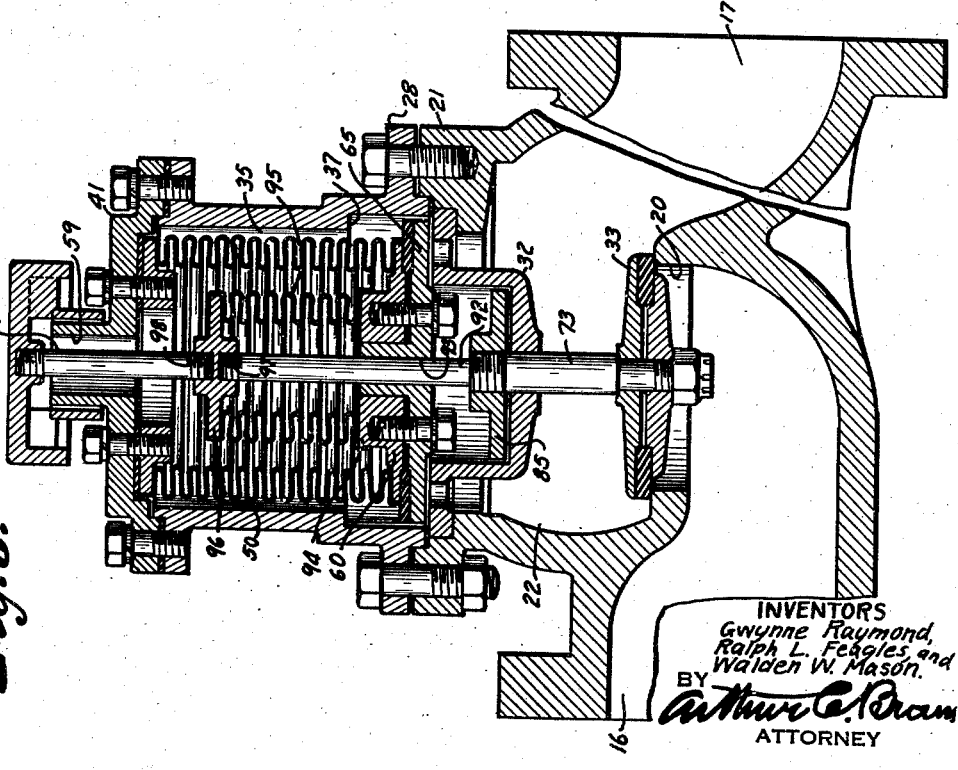

Patented Oct. 1, 1940

2,216,296

UNITED STATES PATENT OFFICE 2,216,296

SHUT-OFF VALVE FOR TANK DISCHARGE LINES

Gwynne Raymond and Ralph L. Feagles, Oklahoma City, Okla., and Walden W. Mason, Kansas City, Mo.

Application July 5, 1938, Serial No. 217,396

8 Claims. (Cl. 137—153)

This invention relates to valves and particularly to an automatic shut-off valve for use in the discharge lines connecting a battery of tanks with a common suction or flow line.

Storage tanks, when connected with a common suction line, may empty at different rates with the result that one or more of them are emptied before the others and a vacuum is drawn within the empty tank or the vacuum is destroyed in the suction line. These are disadvantages brought about due to location of the tanks at different levels, tanks of different capacities, or tanks containing different quantities of liquid.

It is, therefore, the principal object of the present invention to provide a valve in each of the respective discharge lines for maintaining fluid seals at all times and thereby prevent admission of air to the suction line through an emptied tank.

Other important objects of the invention are to provide a valve structure which is normally opened by a predetermined head of liquid acting upon the inlet side and which is automatically closed when the head of liquid drops below the predetermined pressure; and to provide a valve structure with the parts arranged so that suction on the outlet side of the valve cannot effect opening thereof.

It is also an object of the invention to provide the valve with an improved guide means in conjunction with a dashpot or check for effecting control of the valving member.

In accomplishing these and other objects of the invention, we have provided improved details of structure, the preferred forms of which are illustrated in the accompanying drawings, wherein:

Fig. 1 is a perspective view of a battery of tanks respectively located at different elevations and connected by individual drain lines with a common suction or flow line, the drain lines being equipped with automatic valves embodying the features of the present invention.

Fig. 2 is an enlarged vertical section through one of the valves, showing the valving member in open position to permit flow through the valve.

Fig. 3 is a similar sectional view showing the valve parts with a valving member in closed position.

Fig. 4 is a similar section showing the valve member closed and the guide member moved into position for protecting the bellows from excessive pressures that may build up on the outlet side of the valve.

Fig. 8 is a section through a further modified form of valve employing a bellows packing element for sealing around the indicator rod, and showing the valve seated and the bellows fully expanded.

Fig. 9 is a similar section through the valve illustrated in Fig. 4 with the bellows contracted as in the instance of pressure on the outlet side of the valve.

Figure 7:
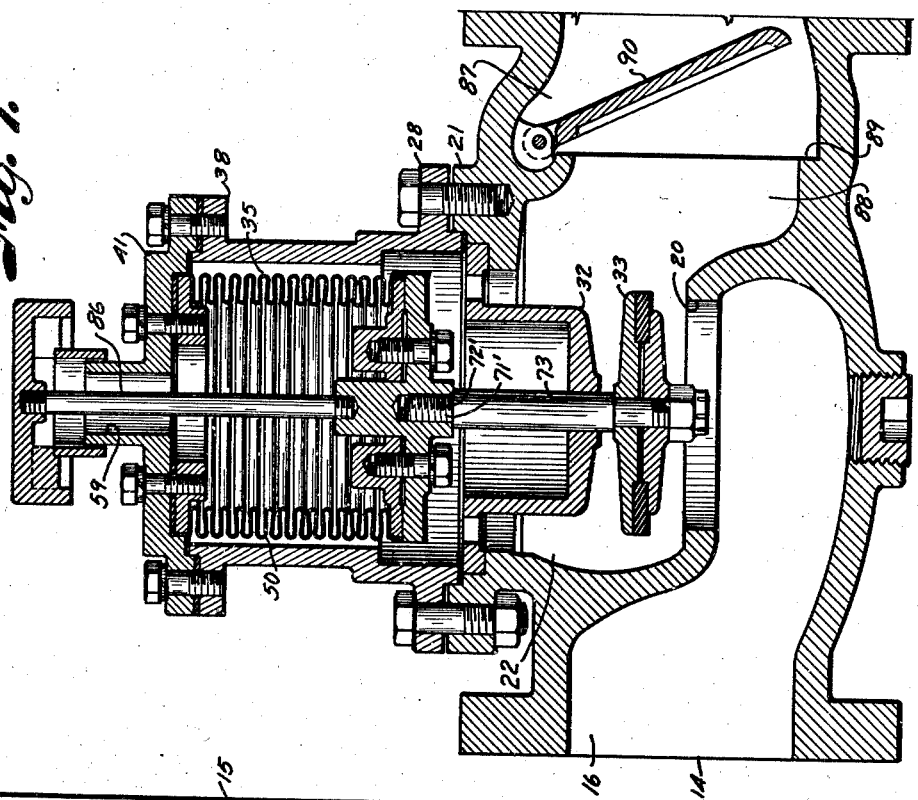
Fig. 7 is a vertical section through a modified form of the invention.
Figure 5:
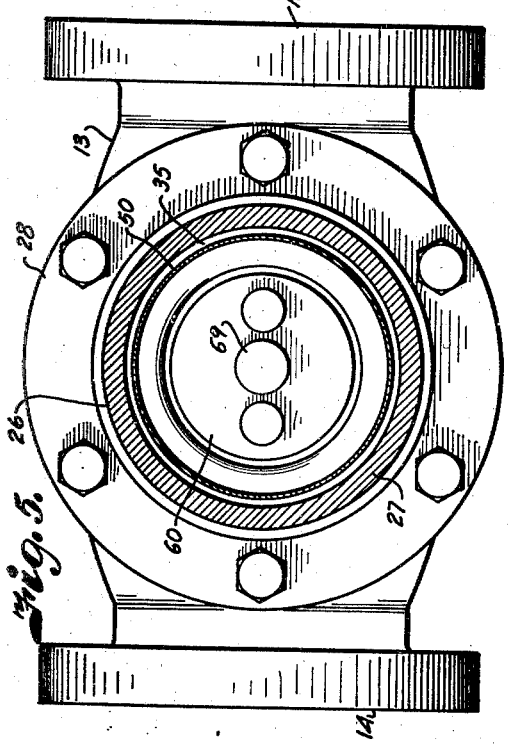
Fig. 5 is a horizontal section through the valve on the line 5—5 of Fig. 4.
Figure 6:
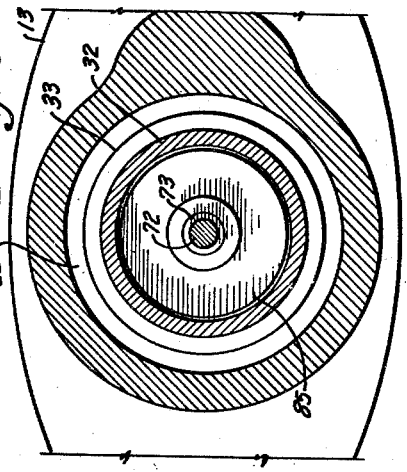
Fig. 6 is a horizontal section on the line 6—6 of Fig. 4.

Referring more in detail to the drawings:

1, 2 and 3 illustrate a battery of liquid storage tanks respectively located at different elevations and provided with drain or discharge lines 4, 5 and 6 connected with a common suction or flow line 7 through which contents of the tanks are moved to a source of disposal. With the arrangement described one of the tanks may be emptied before the others with the result that air is drawn through the emptied tank to break the vacuum within the line, or a vacuum may be drawn in the emptied tank, possibly causing its collapse.

The drain or discharge lines 4, 5 and 6 are, therefore, provided with offsets 7, 8 and 9, and located in respective lines below the offsets are automatic valves 10, 11 and 12, embodying the features of the present invention. The offsets 7, 8 and 9 thus form heads of fluid acting upon the valves, which are sufficient to retain the respective valves in opened position, however, when one of the tanks is empty and the head begins to drop in the offset of the drain line for that tank, the valve is automatically closed, thereby isolating the emptied tank from the suction line 7. The valve thus maintains a seal within the drain or discharge line to prevent drawing of air into the suction line or causing a vacuum to be formed within the emptied tank incidental to continued drain of fluid from the other tanks in the battery.

The valves 10, 11 and 12 are of identical construction and one of them is illustrated in detail in Fig. 2. The valve includes a body member 13 having inlet and outlet connections 14 and 15 which are adapted to be coupled to the adjacent sections of the respective drain lines, and which have flow passageways 16 and 17 separated by a diaphragm 18 having a horizontal portion 19 provided with a port opening 20 connecting the passageways 16 and 17. The passageways are formed on rounded curves and stream lines to reduce friction of the fluid moving through the valve. The valve body also includes a bonnet connection 21, having a cylindrical chamber 22 connecting with the outlet passage 17. The bonnet connection 21 includes a radial flange 23, having the inner face provided with stepped annular shoulders 24 and 25 for a purpose later described.

Secured to the connection 21 is a valve bonnet 26 in the form of a cylindrical jacket 27, having a radially extending flange 28 conforming to the flange 23, and which is provided with an annular rib 29 adapted to engage against a gasket ring 30 seating upon the annular shoulder 24 for clampingly retaining the rim 31 of a dashpot 32 which is suspended within the chamber 22 in axial alignment with the port 20 but spaced therefrom to accommodate a valve member 33, later described. The rim of the dash-pot has a series of openings 34 extending therethrough to communicate with the interior of the valve bonnet. The cylindrical portion of the valve bonnet includes an upper bellows chamber 35 and a concentric lower guide chamber 36 which is of larger diameter to form an annular stop shoulder 37. The upper end of the valve bonnet is provided with a radial flange 38 having an inner annular tongue 39 for centeringly retaining a gasket ring 40 which is seated on the flange 38. Mounted on the gasket ring is a cover plate 41, having an annular flange 42 conforming to the flange 38 and clampingly retained thereto by fastening devices, such as cap screws 43, having their shanks 44 extending through openings 45 in the flange 42 and into threaded openings 46 in the flange 38. The lower face of the cover plate 41 has an annular recess 47 to accommodate the tongue 39 and an inner recess 48 to accommodate the head 49 of a bellows 50.

The bellows includes an annular wall 51 of sufficient diameter to be readily sleeved within the chamber 35 and having accordion folds 52, the mean or effective diameter of which corresponds with the diameter of the port 20. By mean diameter is meant the distance between the vertical median lines of the folds at opposite sides of the bellows. The head 49 comprises a ring secured within an annular flange 53 that snugly engages within the recess 48, the ring being secured to the closure plate 41 by cap screws 54 extending through openings 55 in the plate and into aligning threaded openings 56 in the ring. The closure plate includes a threaded neck 57 extending outwardly within the axis of the bellows and which carries a cap 58 for protecting an axial opening 59 wherethrough the interior of the bellows is connected with atmosphere, the opening 59 communicating with the interior of the bellows through the opening 61 of the bellows head. It is emphasized that the bellows avoids the use of a packing and it may be set so that its tension is against the valve stem when the valve 33 is in open position. This tension, therefore is additive to the weight of the moving parts of the valve to resist the hydrostatic head. The tension may also be set so that it is additive to the suction force.

The cap 58 includes an eaves portion 62 that extends outwardly over the top of the bonnet cover plate and is spaced from the outlet of the opening 59 by radial ribs 63 carrying a threaded collar 64 engaged with the threaded neck 57, as shown in Fig. 2. The lower head 60 is sealed within the lower end of the bellows wall and cooperates with a guide disk 65 to retain a gasket ring 66 therebetween. The disk 65 is loosely guided within the chamber 36 so that the outlet passageway of the valve communicates with the annular space 67 about the periphery thereof. The guide disk is connected with the bellows head 60 by cap screws 68 extending through the disk 65 and into threaded sockets of the head 60. Formed in the axis of the guide disk, and extending through a central opening of the head 60, is a boss 69 aligning with an oppositely directed boss 70 to accommodate a bore 71 that slidably receives a reduced extension 72 of a valve stem 73.

The valve stem 73 is slidable through a guide opening 74 in the bottom of the dash-pot 32 and has a reduced threaded extension 75 on its lower end to form a stop shoulder 76. The valve 33 is of composite construction and includes a disk 77 having an opening 78 for passing the reduced extension 75 and for stop engagement with the shoulder 76. The disk 77 conforms in diameter to the mean diameter of the bellows so that the effective area of the bellows is substantially equal to the effective area of the valve. The outer face of the disk 77 has an annular shouldered recess 79 cooperating with a similar recess 80 of a clamping washer 81 to retain a preferably resilient valve facing ring 82. The clamping washer 81 has an opening 83 to pass the reduced extension 75 and the washer is retained thereon in clamping relation with the disk 77 by a nut 84 mounted on the extension 75.

The length of the valve stem is sufficient to effect seating of the valve over the port 20 when the bellows is fully extended. Threaded on the body portion of the valve stem and slidable within the dash-pot is a disk-like piston 85 to check closing movement of the valve as shown in Fig. 3.

When the valve is closed excessive pressure may build up upon the discharge side of the valve that might cause injury to the bellows. The reduced extension 72 of the valve stem is, therefore, loosely mounted within the bore of the guide 65 so that the guide disk 65 is free to move upwardly in response to high pressures without lifting of the valve from its seat. If the pressure is sufficiently excessive, the valve head will be moved into stop engagement with the annular shoulder 37 so as to avoid further contraction of the bellows as shown in Fig. 4.

The valve may be equipped with an indicator as illustrated in Fig. 7 wherein the cover cap which protects the opening 59 is loosely movable over the boss of the cover plate and is connected with the upper central boss of the guide head by a rod 86 which is of sufficient length to allow the cap to move downwardly with the valve when the valve is moved to seating position. In this instance the valve stem extension 72' is directly threaded within the bore 71' of the guide disk and the dash-pot 32 merely serves as a guide since the check piston has been omitted. This movement of the cap therefore indicates the open or closed position of the valve depending upon the relative spacing of the cap between the cover plate and the valve bonnet. In the valve illustrated in Fig. 7 the outlet side is provided with a check chamber 87 communicating with the outlet passageway through a port 88, having an annular seat 89 engageable with a swing check 90 which is movable responsive to back pressure from the suction line to effect automatic closure of the valve, however, when the suction line is effective the check will swing open responsive to flow of liquid through the valve body, as shown.

Figs. 8 and 9 illustrate a further modified form of the valve which employs the same type of bellows, guide disk and check as illustrated in the preferred form of the invention, and the corresponding parts are designated by the same numerals. This valve, however, is equipped with an indicating means similar to that illustrated in Fig. 7 to show the position of the valve. In this form the check 90 has been omitted since the guide disk is constructed to engage the annular stop shoulder 37 when pressures occur on the outlet side of the valve. Since the bellows is moved independently of the valve it is necessary that the indicator rod 91 be directly connected with the valve, in order to show the actual position of the valve when pressures occur on the outlet side. The valve stem 92 is therefore extended through a bearing opening 93 of the guide disk 65 to connect with the rod 91. In order to prevent leakage about the extended valve stem 92, the head 60 is provided with an annular boss 94 to which is sealingly connected the lower end of a bellows 95. The upper end of the bellows sealingly connects with a head 96 having internally threaded sockets 97 and 98 on the respective sides thereof to threadedly connect the adjacent ends of the valve stem extension 92 and indicator rod 91 respectively.

Valves constructed and assembled as described operate as follows:

If the bellows is set as in Fig. 3 the weight of the moving parts plus the slight tension in the bellows is overbalanced by the weight of the head of fluid in the offsets 7, 8 and 9 so that the head operating against the bottom face of the valve through the port 20 supports the valve in open position, as shown in Fig. 2. When one of the tanks has been emptied and the head drops in the offset for that tank, weight of the moving parts and tension in the bellows preponderates over the hydrostatic pressure and the valve is moved to closed position thereby shutting off the empty tank from the flow line so that pumping may continue from the other tanks. Since the area of the upper face of the valve corresponds to the effective median area of the bellows, the pressures will equalize and the suction in the outlet passageway acts equally against the valve and bellows with the result that the valve remains closed. With the valve closed, a liquid seal is trapped in the inlet side of the drain line for the empty tank, and there is no chance for breaking the vacuum in the flow line by drawing air through the tank or drawing a vacuum in the tank that might cause its collapse. In case of high pressures on the discharge side of the valve the pressures will act through the openings 34 of the dash-pot rim against the face of the guide disk to move the guide disk in seating relation with the stop shoulder 37, and thereby prevent further compression or damage to the bellows.

Fig. 4 may illustrate the normal setting of the valve where the bellows is constructed to provide tension additive to the suction. The opposing force is, therefore, simply the weight of the valving member, stem, and the dash-pot piston. With the valve closed the Sylphon bellows is effective to prevent the valve from opening when a predetermined suction pressure occurs in the chamber above the valving member since the bellows is moved by atmospheric pressure against the valve stem. The bellows must be of such selection that the force to open or close it is almost negligible and with that assured, suction will not open the valve with the normal position as shown in Fig. 4.

Should a high pressure occur on the outlet side of the valve shown in Fig. 7, the check 90 will swing shut to protect the bellows.

In the form of invention illustrated in Figs. 8 and 9, the valve is moved to closed position by the main bellows pulling down on the small bellows which in turn pulls down on the valve stem to effect seating of the valving member supplemented by weight of the moving parts. Closure of the valve is indicated by the position of the cap 58. Should high pressure build up on the outlet side of the valve, with the valving member seated, the guide disk 65 will move over the valve stem extension 92 until stopped by the shoulder 37. This does not effect unseating of the valving member since it is held closed by the pressure acting thereon. The position of the indicator is also not changed because it is rigidly connected with the valve member.

What we claim and desire to secure by Letters Patent is:

1. A valve of the character described including a valve body having inlet and outlet connections communicating through a port in said valve, a valve member closing said port when pressure in said inlet connection drops below a predetermined value, a Sylphon bellows in the valve and subject to pressures in the outlet connection, a lost motion connection between the bellows and said valve member, means connecting the interior of the bellows with atmosphere, a dash-pot suspended in the valve, and a piston in the dash-pot and connected with said connecting means.

2. A valve of the character described including a valve body having inlet and outlet connections communicating through a port in said valve, a valve member closing said port when pressure in said inlet connection drops below a predetermined value, a bellows in the valve and subject to pressures in the outlet connection, a lost motion connection between the valve member and the bellows, a guide on said lost motion connection, means connecting the interior of the bellows with atmosphere, the effective area of said valve being approximately equal to the effective area of said bellows on the outlet side whereby suction pressures on the outlet side are ineffective in opening said valve, and stop means in the valve body and engageable by said guide to prevent collapse of the bellows responsive to excessive positive pressures on said outlet side of said valve.

3. A valve of the character described including a valve body having inlet and outlet connections communicating through a valve port, a valving member arranged to open and close said port, a bellows supported in the valve body on the outlet side of said valve to retain the valve member seated when a drop in pressure occurs on said outlet side, a lost motion connection between the valving member and the bellows, a dash-pot functioning with said lost motion connection for controlling closing movement of the valving member independently of actuation of the bellows, and means connecting the interior of the bellows with atmosphere.

4. A valve of the character described including a valve body having inlet and outlet connections communicating through a valve port and having a bellows chamber on the discharge side of said port, a valving member arranged to open and close said port, a bellows supported in said chamber, means connecting the valving member with the bellows, a dash-pot functioning with said connecting means for controlling closing movement of the valving member, a guide disk on said connecting means, stop means below the bellows chamber adapted to be engaged by said guide disk to prevent collapse of the bellows when excessive pressures occur in said outlet connection, and means connecting the interior of the bellows with atmosphere.

5. A valve of the character described including a valve body having inlet and outlet connections communicating through a valve port, a valving member arranged to open and close said port, a bellows supported in the valve body on the outlet side of said valve, a lost motion connection between the valving member and the bellows, a dash-pot functioning with said lost motion connection for controlling closing movement of the valving member independently of actuation of the bellows, means connecting the interior of the bellows with atmosphere, and an indicator connected with said valving member and extending exteriorly of the valve body for indicating position of said valving member.

6. A valve of the character described including a valve body having inlet and outlet connections communicating through a port in said valve and having bellows and guide chambers positioned above said port, a valve member controlling said port, a bellows in the bellows chamber and subject to pressures in the outlet connection, a lost motion connection between the bellows and said valve member, a guide disk on said lost motion connection and slidable in said guide chamber, and means independently of said inlet and outlet connections for connecting the interior of the bellows with atmosphere, the effective area of said valve being approximately equal to the effective area of said bellows on the outlet side whereby said pressures are ineffective in opening said valve.

7. A valve of the character described including a valve body having inlet and outlet connections communicating through a port in said valve, a valve member closing said port when pressure in said inlet connection drops below a predetermined value, a bellows in the valve and subject to pressures in the outlet connection, a valve stem movable through the bellows, a second bellows connecting the valve stem with the first bellows, and an indicator connected with the valve stem to indicate position of the valve member.

8. A valve of the character described having inlet and outlet connections upon opposite sides of a valve port, a valve member for closing said port and responsive to hydrostatic pressure in the inlet connection to effect flow through the valve and adapted to seat when the pressure in the outlet connection exceeds the pressure in the inlet connection, atmospheric pressure influenced means in said valve on the side of said outlet connection and responsive to suction pressure in the outlet connection to retain the valve member seated upon absence of hydrostatic pressure in said inlet connection, said atmospheric pressure influenced means being ineffective on said valve when said higher pressure occurs in the outlet connection, and means connected with the valve member and movable with the valve member independently of said atmospheric pressure influenced means for indicating position of the valve member exteriorly of said valve.

GWYNNE RAYMOND.
RALPH L. FEAGLES.
WALDEN W. MASON.